United States Patent [19]

Mergey et al.

[11] Patent Number: 4,652,714
[45] Date of Patent: Mar. 24, 1987

[54] PROCESS FOR WELDING CYLINDRICAL CONTAINER BODIES

[75] Inventors: Claude Mergey, Ville d'Avray; Patrice Robichon, Croissy-sur-Seine, both of France

[73] Assignee: Carnaud S.A., France

[21] Appl. No.: 675,585

[22] Filed: Nov. 28, 1984

[30] Foreign Application Priority Data

Oct. 14, 1983 [FR] France ................. 83 16357

[51] Int. Cl.$^4$ ............................................. B23K 11/06
[52] U.S. Cl. ........................................ 219/64; 219/83; 219/117.1
[58] Field of Search .................. 219/64, 83, 117.1, 118

[56] References Cited

U.S. PATENT DOCUMENTS

| | | | |
|---|---|---|---|
| 4,410,781 | 10/1983 | Riviere | 219/64 |
| 4,421,828 | 12/1983 | Alloue et al. | 219/64 |

FOREIGN PATENT DOCUMENTS

| | | |
|---|---|---|
| 0025396 | 3/1981 | European Pat. Off. |
| 0041893 | 12/1981 | European Pat. Off. |
| 1258185 | 2/1961 | France |
| 2304434 | 10/1976 | France |
| 2362056 | 3/1978 | France |
| 2483824 | 12/1981 | France |
| 2465011 | 9/1982 | France |
| 2516553 | 5/1983 | France |
| 119796 | 9/1981 | Japan |
| 2072074 | 9/1981 | United Kingdom |

*Primary Examiner*—Harold Broome
*Assistant Examiner*—Catherine M. Sigda
*Attorney, Agent, or Firm*—Sughrue, Mion, Zinn, Macpeak and Seas

[57] ABSTRACT

The process relates to the welding of the cylindrical bodies of food cans in which the body is rolled with edges overlapping along a longitudinal welding line between resistance welding electrodes. The ratio of the radius of curvature of a first electrode with respect to the second is at least equal to 1.2. The material constituting the body is mild steel sheet having on one face at least, a protective conductive coating whose contact resistivity with respect to copper is at least $10^{-5}$ ohm/cm$^2$. A material is selected having a ratio of the contact resistivity of a first face to that of the second at least equal to 1.2, and the material is rolled in such a way that the first face is in contact with the first electrode. The preferred materials have on each face a layer of tin of at the most 1.05 g/m$^2$ and a composite layer of metallic chromium (5-140 mg/m$^2$) and of chromium in oxidized form (1-30 mg/m$^2$), the thickness of tin on the first face being less than that on the second and/or the thickness of chromium of the second face being less than that of the first. The use of the asymmetry of contact resistivity as defined, increases the latitude of welding (width of the range of angle of conduction of the welding voltage). Reversal of the asymmetry cancels the latitude of welding.

16 Claims, 1 Drawing Figure

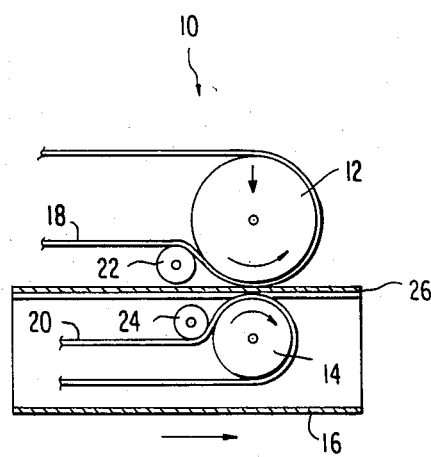

PROCESS FOR WELDING CYLINDRICAL CONTAINER BODIES

BACKGROUND OF THE INVENTION

The invention relates to a process for roller spot welding of cylindrically shaped container bodies, particularly food cans in a material comprising a mild steel sheet having on at least one of its faces a protective conductive coating whose contact resistivity with respect to copper is at least $1 \times 10^{-5}$ ohm/cm$^2$.

More particularly the invention relates to a roller spot welding process in which each surface of the sheet is coated with a layer of tin containing at most 1.05 g/m$^2$ covered with a composite layer of chromium and chromium oxide consisting of 5 to 140 mg/m$^2$ of metallic chromium and 1 to 30 mg/m$^2$ of chromium in oxidised form.

In roller spot welding, overlapping edges of a body are rolled together along a longitudinal welding line while the body advances at a speed which can reach at least 50 m/min., and is held between two resistance welding electrodes.

French Pat. No. 1,258,185 describes a welding machine in which the two electrodes are rollers, and a copper wire is interposed between the rollers and the faces of the body along the longitudinal welding line. The diameter of the roller which is applied to the inner face of the body is less than that of the body so that the body can pass over that roller, while the other roller has a greater diameter.

Similar machines are known, in which the electrode over which the container body passes is a block, which is rectilinear or has a large radius of curvature, and which is mounted facing the external roller electrode.

Roller spot welding is a particular type of resistance welding, in which the passage of current between two electrodes which are applied to overlapping sheets causes localised melting of the metal of the sheets where they are in contact, with cross penetration of the molten metal. A good quality spot weld requires that metal of both sheets form the molten zone, without that zone extending through to the external surfaces of the sheets. The heating which occurs is proportional to the contact resistances between faces of the sheets and corresponding electrodes, the resistance of the thickness of the sheets, and the contact resistance between the lapped sheets.

In addition because the electrodes are relatively massive and are made of a metal which is a good conductor of heat, they drain thermal energy from the spot weld and, in particular cool the areas which they are in contact. Electrical and thermal conductivities of metals are related, both being due to electron movements.

The intrinsic electrical resistance of the sheets is well defined, even if the current flow is not everywhere normal to the welding plane. The contact resistance between different metals is however quite different from a theoretical ohmic resistance, and depends on a number of conduction mechanisms which are generally non-linear. A contact resistance cannot be defined without specifying the measurement conditions, essentially current density and contact pressure; and in order to obtain significant measurements it is desirable to specify operating conditions close to those which are encountered during welding.

In French Pat. No. 2,465,011 (corresponding to U.S. Pat. No. 4,421,828 —Alloue and Mergey), the Applicants have described a method of measurement according to which the coated sheet whose contact resistivity is to be measured is held between two copper electrodes each having a contact area of 10 mm$^2$, with a clamping force of 1,400 Newtons; a current of 1 ampere is passed between the electrodes, and the voltage drop between the electrodes is measured. This voltage is between 50 microvolts and a few millivolts for the usual materials.

This method of measurement is comprehensive, in that it takes into account the contact resistivity between each electrode and the coated face to which it is applied. From this there has been developed a method of deriving the contact resistivity at the interface of an electrode and a coated face. It was found that the contact resistivity between the copper electrodes themselves was about 50 microohms, and that the overall contact resistivity of tin plate did not differ significantly from this value. Additionally values of substantially the same order were found with any coated steel sheet, by removing the coatings by abrasion, and by electrolytically tinning the exposed surfaces to produce a coating corresponding to a typical tin plate (at least 1.2 g/m$^2$ and preferably 2.8 g/m$^2$ per face). The intrinsic resistance of the mild steel sheet, taken transversely on a section of 10 mm$^2$, is about 2.5 microohms. As a result, the contact resistivity between copper and the coating of one face can be determined by locally removing the coating of the other face, electrolytically coating with tin the area from which the coating has been removed, and measuring the contact resistivity by the method previously defined, with an electrode in contact with the tin coating.

The text which follows will refer to contact resistivity relative to copper, in terms of resistance per unit surface area. By convention, the square centimeter will be used as the unit of surface area, and the values will be expressed in $10^{-5}$ ohm/cm$^2$. If the unit is not explicitly specified, it is this unit, $10^{-5}$ ohm/cm$^2$, which is used.

It will be noted that the contact resistance between the faces of sheets which are applied one against the other along the longitudinal welding line causes heating at the exact place where the temperature must be at a maximum, whilst the contact resistances between faces of sheets and electrodes are located where the heating must be a minimum. A priori, it would therefore be desirable that the contact resistance between the contacting faces of sheets be at a maximum, and the contact resistances between the faces of the sheets and the electrodes which contact them be at a minimum. But a correlation exists between the contact resistances between sheets, and between electrodes and sheets. In addition, there is the influence of the thickness of the sheets which affects the heating in the mass of the sheets, and the rapidity of diffusion of the heat in the welding area towards the electrodes.

All these parameters which determine the quality of the resistance welding are supplemented by parameters intrinsic to roller spot welding, particularly to roller spot welding of cylindrical container bodies under the conditions mentioned above.

A first constraint is due to the speed of passage of the bodies. A spot weld is formed at each half cycle of an alternating voltage at a frequency of a few hundred Hertz, which is applied between the electrodes by an appropriate transformer. Regulation of the energy dissipated in the spot welds is obtained by regulation of the conduction angle of controlled discharge semi-conductors connected in the primary circuit of the transformer. Even when the conduction angle is carefully stabilised, problematical variations in the electrical properties of the sheets and of the electrodes give rise to fluctuations in the quality of the spot welds. The weldability of sheets, such as those which constitute the bodies of food cans, not only means their suitability for spot welding after a suitable adjustment. The probability must also be considered of the appearance of defective spot welds during production with a usual setting, as a consequence of problematical variations of the properties of the sheets and of the electrodes. This aspect of the quality of the welding can be expressed, at least qualitatively, by a range of variation of the conduction angle within which acceptable results in production are obtained. This range will be called welding latitude.

Other constraints particular to the roller spot welding of cylindrical bodies will be mentioned later.

French Pat. No. 2,465,011 referred to above relates to a material having layers of uncombined tin on the two faces of a mild steel sheet, covered with a composite layer of chromium and chromium oxide containing from 50 to 100 mg/m$^2$ of metallic chromium and from 6 to 25 mg/m$^2$ of chromium in oxidised form. European Patent Application No. EP 25,396 specifies that the layer of tin is from 0.1 to 1.5 g/m$^2$.

This material is noteworthy for its weldability by roller spot welding, in that it has not been heated, prior to welding, so that a negligible part of the tin is alloyed with the underlying iron. This excludes lacquering of the sheet with a polymerised organic lacquer prior to welding, at a temperature above or equal to 200° C.

Japanese Patent Application No. 56-119796 (1981) describes a chrome steel strip with, on one face, 5 to 50 mg/m$^2$ of metallic chromium and 2 to 30 mg/m$^2$ of chromium in oxidised form, and on the other face, 0.5 to 10 mg/m$^2$ of metallic chromium and 2 to 30 mg/m$^2$ of chromium in oxidised form. This material may be roller spot welded, at a speed of 20 m/min. The weldability is due to the fact that the total quantity of metallic chromium is limited, which correspondingly reduces the overall electrode/sheet/sheet/electrode contact resistance. In addition, a coating comprising from 0.5 to 10 mg/m$^2$ of metallic chromium ensures a suitable protection for the external surface of a can body, which is to be coated with a film of paint, the role of the metallic chrome being to ensure the bond between the steel and the chromium oxide. The work of the Applicant company however leaves doubts as to the pertinence of the mechanism referred to in this Japanese application, without, however, casting doubts on the weldability of the material at the specified speed of passage and the production of the welding quality referred to.

French Patent Application No. 81 21,384 (FR-A-2,516,553) decribes a steel sheet which is coated on one side with a layer of tin between 0.2 and 10 g/m$^2$, and on the other side with a composite layer of metallic chromium (20–250 mg/$^2$) and of chromium in an oxidised form (5–40 mg/m$^2$). This material can be roller spot welded at an unspecified speed of passage. The weldability is attributed to the fact that the contact between the two faces of the sheet only comprises one thickness of chromium and one thickness of chromium oxide instead of two as for prior materials, and this is stated to reduce the resistance of the current path. Moreover, the tin is stated to protect against one kind of corrosion and the composite layer against another kind of corrosion. For example, the tin is stated to be suitable for contact with food products, and the composite layer of chromium and chromium oxide is stated to be effective against corrosion due to atmospheric agents.

The conclusions drawn by the Applicants from their work on weldability by roller spot welding do not agree with the views expressed in No. FR-A-2,516,553, on the weldability of the material described in that prior application. The preferred arrangement in No. FR-A-2,516,553 is tin on the internal face of the body of the can, which is not particularly effective for internal lacquering, since tin is not a very effective bonding surface for lacquer, particularly in the case of thin coatings (0.2 to 1.05 g/m$^2$). As already stated chromium/chromium oxide coatings have the effect, amongst others, of improving the bonding of lacquers. This would lead in many cases to using thicknesses of tin sufficient in themselves to protect the sheet against corrosion, that is to say using quantities of tin comparable to those of the conventional tin plate. Conventional tin plate can, of course, be roller spot welded without any great difficulty. Further the Applicants' experience leads them to believe that an installation capable of reliably depositing tin on one face of a sheet, and a composite chromium/chromium oxide coating on the other face, would be complex and be subject to production problems.

SUMMARY OF THE INVENTION

It is a main object of the invention to provide a process for the roller spot welding of container bodies, in particular food cans, which employs a material having on its faces a protective conductive coating whose contact resistivity with respect to copper is greater than $1 \times 10^{-5}$ ohm/cm$^2$.

A further object of the invention is a welding process of this kind which allows a greater latitude of adjustment of the welding current.

According to the invention there is provided a process for welding cylindrically shaped container bodies, in particular food cans, employing mild steel sheet material having on at least one of the faces of the mild steel sheet a protective conductive coating whose contact resistivity with respect to copper is at least $1 \times 10^{-5}$ ohm/cm$^2$, in which overlapping edges of the body are rolled together along a longitudinal welding line between two resistance welding electrodes while advancing at a speed which can reach at least 50 m/min., and the ratio of the radius of curvature of a first welding electrode to that of the second welding electrode is at least 1.2, characterised in that a sheet material is selected in which the ratio of the contact resistivity of a first face to the contact resistivity of the second face is at least 1.2, and the material is rolled with the first face in contact with the first electrode.

According to a further aspect of the invention a roller spot welding process is carried out with a material whose two faces are coated with a thin layer of tin and with a composite layer of chromium/chromium oxide, the tin being totally alloyed with the iron.

On conventional welding machines of the kind described in French Pat. No. 1,258,185, the roller around which the body passes is necesarily of reduced diameter, so that it contacts only the internal face of the body along the welding line, while the other roller is of much greater diameter for constructional reasons and to give correct operation. Also the contact surface between the first roller and the inner face of the body is smaller than the contact surface of the other roller with the outer face of the body. The presence of a copper wire placed between the rollers and the faces of the body does not substantially change this relationship of the contact surfaces.

The situation is reversed when the internal electrode around which the can body passes has a radius of curvature greater than that of the roller which forms the second electrode contacting the outer face of the body.

The Applicants' have surmised that the asymmetry of the contact surfaces may lead to problems with the quality of the spot welds, because energy released at the interface between the electrode with a smaller radius of curvature and the edge which it contacts is greater than the energy released at the interface between the second edge of the body and the electrode with a greater radius of curvature. In addition, the first edge is not as well cooled as the second edge by the diffusion of the heat towards the respective electrodes.

Moreover, the energy release at the first interface affects a lesser surface.

The following description refers to the more usual construction of welding machines with a small diameter inner roller, and an external roller of greater diameter. That is the electrode with the smaller radius of curvature is the inner roller, and the face in contact with the electrode with the smaller radius of curvature is the inner face of the can body.

According to No. FR-A-2,483,824, the inner contact surface can be increased by providing an auxiliary roller close to the inner roller, to support copper wire against the inner edge of the body over an increased length.

The present invention thus provides a method for compensating for the asymmetry of the contact surfaces of the electrodes with the faces of the sheet material, by an asymmetry of the contact resistivity of the faces of the sheet material with respect to copper, so as to balance the contact resistances, at least qualitatively. The method of measurement of the contact resistivity of a face of the coated sheet material with respect to copper is referred to above. The Applicants have studied the variations of contact resistivity which result from a thickness variations either of the layer of tin, or of the composite layer of chromium and chromium oxide, and have shown reductions in contact resistivity with increase in thickness of tin, and increases in contact resistivity with the increase in thickness of the composite layer of chromium and chromium oxide.

Subsequent welding tests on materials with coatings of different contact resistivities due to thickness differences, have shown that as long as the contact resistivity with respect to copper of the coatings of the two faces was less than $1 \times 10^{-5}$ ohm/cm$^2$, the weldability was good with acceptable variations whatever the relationship between the contact resistivities, and that when the contact resistivity with respect to copper of one face of the sheet material exceeds $1 \times 10^{-5}$ ohm/cm$^2$, and further when the contact resistivity of both faces exceed this value, there was a distinctly greater latitude for acceptable welding variations when the face with the lower contact resistivity was contacted by the smaller roller, while all latitude disappeared when the face of lower contact resistivity was contacted by the larger roller.

It was also established that the asymmetry of the coating thicknesses or of the contact resistivity played a more important role than the absolute values of these thicknesses or contact resistivities. Finally, it was established that certain materials which were thought not to be weldable by roller spot welding, were in fact weldable if their coatings were asymmetrical and welding was carried out according to the rules stated above regarding operation with arrangements of electrodes having different radii of curvature. Materials with a thin layer of tin and an overlying composite layer of chromium and of chromium oxide can thus be roller spot welded with a comfortable latitude of welding quality even when all the tin had been alloyed to the iron during stoving at a temperature of at least 200° C., such as during polymerisation of lacquer.

BRIEF DESCRIPTION OF THE DRAWING

The drawing illustrates a conventional welding apparatus suitable for welding a can body seam in accordance with the method of the invention.

DETAILED DESCRIPTION OF THE INVENTION

The characteristics and advantages of the invention will be seen from the description which follows, and which includes examples.

EXAMPLE 1

Appraisal of the welding latitude

A series of tests were carried out on a roller spot welding machine having an outer welding roller, with a diameter about double that of the inner welding roller, using sheet materials for producing the bodies of food cans, such as can body 16. A copper wire 18 or 20 runs along a portion of the periphery of each of the welding rollers and is guided by a small guide roller 22 or 24. The overlapping sheet material is gripped between the welding roller for welding the seam 26. These materials are as described in French Pat. No. 2,465,011, that is having on each face a layer of tin preferably less than 1.5 g/m$^2$, and a composite layer of chromium and of chromium oxide with from 50 to 100 mg/m$^2$ of metallic chromium, and from 6 to 25 mg/m$^2$ of chromium in oxidised form. These tests were intended to highlight the variations of the latitude of welding, expressed in terms of the conduction angle, which result from the use of materials having asymmetrical coatings. The test materials were stoved for 30 minutes at 200° C., corresponding to the conditions employed for polymerising protective lacquers. Comparative results are given for conventional tin plate, and for an unstoved test piece in accordance with French Pat. No. 2,465,011. Table I sets out the latitude of welding obtained as a function of the thicknesses of the different coatings on the inner and outer faces of the can body.

TABLE I

|  | Inner Face | | | Outer Face | | | Latitude of welding (% of conduction angle) |
| --- | --- | --- | --- | --- | --- | --- | --- |
| Test | Sn g/m$^2$ | Cr mg/m$^2$ | CrOx mg/m$^2$ | Sn g/m$^2$ | Cr mg/m$^2$ | CrOx mg/m$^2$ | |
| Tin plate | 2.8 | <10 | <10 | 2.8 | <10 | <10 | 10 |
| Sample (1) | 0.7 | 60 | 12 | 0.7 | 60 | 12 | 10 |
| A (2) | 0.7 | 60 | 12 | 0.7 | 60 | 12 | 1-3 |
| B (2) | 0.8 | 60 | 10 | 0.3 | 60 | 10 | 8-10 |
| C (2) | 0.5 | 40 | 10 | 0.5 | 90 | 20 | 6-8 |
| D (2) | 0.8 | 40 | 10 | 0.3 | 90 | 20 | 10-12 |

(1) unstoved
(2) stoved
Note: the reversal of the inner and outer faces in tests B, C and D resulted in latitudes of welding which are practically nil.

The results of Table I show that when the coatings of the sheet materials are asymmetrical, the way in which this material is presented for welding relative to the rollers of different diameters, is very influential on the latitude of welding. Significant widenings of the latitude of welding are observed for materials with coatings of asymmetrical thickness, compared with a symmetrical material (test A), when the tin coating of smaller thickness is on the outside (test B), when the chromium and chromium oxide coating of smaller thickness is on the inside (test C), and better still when these asymmetries are both present (test D). As indicated above, the reversal of the asymmetry results in a practically nil latitude of welding. It is clear that the latitude of welding is an essential criterion of weldability, at least for serious industrial use.

However the results set out in this Example 1 are indicative only, and do not permit the establishment of precise rules which are capable of increasing the reliability of roller spot welding.

Another approach was tried by determining the contact resistivity of one face of the material with respect to copper, as a function of the thickness of tin, and of chromium and of chromium oxide. The procedure set out above was followed, in which the contribution of the other face of the material to the voltage drop between the electrodes was eliminated, by abrasion followed by electrolytic tinning.

EXAMPLE 2

Variation of the contact resistivity as a function of the thickness of tin

Tests were made with a material having a layer of tin of variable thickness on the face being tested, covered by a composite layer comprising 60 mg/m$^2$ of metallic chromium and 10 mg/m$^2$ of chromium in oxidised form. For each thickness of tin, the contact resistivity of the face of the material was measured fresh from manufacture, and after stoving for 20 minutes at 200° C. These results are summarised in the following table:

TABLE II

| Thickness of tin g/m$^2$ | 0.2 | 0.3 | 0.4 | 0.5 | 0.6 | 0.7 | 0.75 | 0.8 | 0.9 | 1.0 | 1.1 |
|---|---|---|---|---|---|---|---|---|---|---|---|
| Contact Resistivity Before stoving 10$^{-5}$ ohm/cm$^2$ | 0.5 | 0.5 | 0.5 | 0.5 | 0.5 | 0.5 | | 0.5 | 0.5 | 0.5 | 0.5 |
| Stoved 10$^{-5}$ ohm/cm$^2$ | 4.9 | 5.0 | 4.9 | 4.3 | 4.2 | 2.5 | 3 | | 0.6 | 0.6 | 0.6 | 0.6 |

Notes: a certain distribution of measurements after stoving was recorded. Nevertheless, it appears that for tin thicknesses over 0.8 g/m$^2$ there are no further significant variations of the contact resistivity, which is established substantially at the same value as the tinned steel. For tin thicknesses below 0.8 g/m$^2$ the values measured all exceed 2 × 10$^{-5}$ ohm/cm$^2$. It is not impossible that this value of 0.8 g/m$^2$ corresponds approximately to the quantity of tin which is alloyed to the iron during stoving.

EXAMPLE 3

Variations of the contact resistivity as a function of the thickness of chromium A sheet material was used having on its face being tested a layer of tin of 0.6 g/m$^2$, covered by a composite layer of chromium and of chromium oxide. The thickness of the composite layer is expressed as total chromium, in the knowledge that the conditions during deposition of the composite layer were substantially constant, with the exception of the electrical charge per unit of surface. The measurements were made after the tin had completely alloyed with the iron as a result of heating.

TABLE III

| Cr thickness mg/m$^2$ | 0 | 5 | 10 | 15 | 20 | 40 | 50 | 70 | 90 | 110 |
|---|---|---|---|---|---|---|---|---|---|---|
| Contact Resistivity 10$^{-5}$ ohm/cm$^2$ | 0.5 | 1.0 | 2.0 | 2.7 | 3 | 3.6 | 3.4 | 4.0 | 4.5 | 5.0 |

It will be noted that from 20 mg/m$^2$ of chromium, the contact resistivity can be defined by the formula:

$$\rho sCr = (2.55 + 0.022x)10^{-5} \text{ ohm/cm}^2$$

x being the thickness of total chromium in mg/m$^2$.

EXAMPLE 4

Subsequently, the Applicants studied the latitude of welding obtained by the use of various materials having asymmetries of contact resistivity, using materials which are usual in the manufacture of cylindrical food cans. The results are shown in Table IV.

These tests were carried out on a roller spot welding machine, with the insertion of a copper wire 1.38 mm in diameter, which was flattened in such a way that its largest diameter was 1.8 mm. The speed of advance of the can bodies was 50 m/min., with the usual tolerance. The diameter of the outer roller was 110 mm, and the diameter of the inner roller was 60±2 mm. The gripping force of the rollers was 400N. Variations in diameter of the inner roller between 62 and 58 mm, were due to remachining to renovate the contact surface. This corresponds to a relative variation in diameter of 6.7%, and the results have not been changed to any significant extent by such variations in diameter of the inner roller.

In Table IV expressions and abbreviations usual in the industry are used, which are explained as follows:

Tin plate, is a mild steel sheet both faces of which are coated with tin of a sufficient thickness to resist corrosion in the conditions of use without additional coating. The tin thickness is usually at least 2.8 g/m$^2$. The tin is frequently alloyed to the iron, and undergoes a passivation by chromium treatment.

Black plate, is mild steel sheet which has not been coated.

E.C.C.S., is mild steel sheet, coated on each of its faces with a composite layer of chromium and chromium oxide comprising 30 to 200 mg/m$^2$ of metallic chromium and 5 to 20 mg/m$^2$ of chromium oxide.

L.T.S., is mild steel sheet, coated with a thin layer of non-alloyed tin and with a composite layer of chromium and chromium oxide, as described in French Pat. No. 2,465,011.

The term, "NS", means unweldable.

The different mild steel substrates have thicknesses of between 0.15 and 0.49 mm.

TABLE IV

| | COATINGS | | Contact Resistivity Cu (10$^{-5}$ Ω/cm$^2$) | | | WELDING LATITUDE | |
|---|---|---|---|---|---|---|---|
| MATERIALS | Face A | Face B | Face A | Face B | $\rho B/\rho A$ | Face A /small dia. roller | Face B /small dia. roller |
| (1) Tin plate | Sn | Sn | 0.4–0.5 | 0.4–0.5 | 1 | 10–12 | 10–12 |

TABLE IV-continued

| | COATINGS | | Contact Resistivity Cu ($10^{-5}\ \Omega/cm^2$) | | | WELDING LATITUDE | |
| --- | --- | --- | --- | --- | --- | --- | --- |
| MATERIALS | Face A | Face B | Face A | Face B | ρB/ρA | Face A /small dia. roller | Face B /small dia. roller |
| Tin 2.8/2.8 | 2.8 g/m² | 2.8 g/m² | | | | | |
| (2) Black plate | Nil | Nil | 20–100 | 20–100 | 1 | N.S. | N.S. |
| (3) E.C.C.S. | Cr° 30–200 mg/m² Crox 5–20 mg/m² | Cr° 30–200 mg/m² Crox 5–20 mg/m² | 50–500 | 50–500 | 1 | N.S. | N.S. |
| (4) Tinned plate 1 face | Sn 2.8 g/m² | Nil | 0.4–0.5 | 20–100 | 133 | 10–15 | N.S. |
| (5) Nickel plate | Ni 150 mg/m² | Ni 150 mg/m² | 8–10 | 8–10 | 1 | 2–3 | 2–3 |
| (6) Nickel-chrome plate | Ni 150 mg/m² | Ni 150 mg/m² + Cr 50–60 mg/m² + Crox 10–15 mg/m² | 8–10 | 20–30 | 2.8 | 7–10 | N.S. |
| (7) L.T.S. before stoving | Sn 0.4–0.6 g/m² Cr° 50–60 mg/m² Crox 10–12 mg/m² | Sn 0.4–0.6 g/m² Cr° 50–60 mg/m² Crox 10–12 mg/m² | 0.5–0.7 | 0.5–0.7 | 1 | 8–10 | 8–10 |
| (8) Same L.T.S. stoved 2 × 10–12 min at 200° C.–205° C. | as above | as above | 3.8–4.7 | 3.8–4.7 | 1 | 1–3 | 1–3 |
| (9) L.T.S. asymmetrical in Sn stoved 2 × 10–12 min at 200° C.–205° C. | Sn 0.7–0.8 g/m² Cr° 50–60 mg/m² Crox 10–12 mg/m² | Sn 0.2–0.3 g/m² Cr° 50–60 mg/m² Crox 10–12 mg/m² | 1.1–3.5 | 4.5–5.0 | 2.06 | 8–10 | N.S. |
| (10) L.T.S. asymmetrical in Sn stoved 2 × 10–12 min at 200° C.–205° C. | Sn 0.4–0.6 g/m² Cr° 25–35 mg/m² Crox 10–12 mg/m² | Sn 0.4–0.6 g/m² Cr° 75–85 mg/m² Crox 10–12 mg/m² | 3.3–4.2 | 4.4–5.2 | 1.28 | 6–8 | N.S. |
| (11) L.T.S. asymmetrical in Sn and in Cr stoved 2 × 10–12 min. at 200° C.–205° C. | Sn 0.7–0.8 g/m² Cr° 25–35 mg/m² Crox 10–12 mg/m² | Sn 0.2–0.3 g/m² Cr° 75–85 mg/m² Crox 10–12 mg/m² | 0.8–2.9 | 5.0–5.5 | 2.8 | 10–12 | N.S. |
| (12) L.T.S. asymmetrical in Sn and in Cr° stoved 2 × 10–12 min. at 200° C.–205° C. | Sn 0.4–0.6 g/m² Cr° 25–35 mg/m² Crox 10–12 mg/m² | Sn 0.01–0.1 g/m² Cr° 75–85 mg/m² Crox 10–12 mg/m² | 3.3–4.2 | 17–26 | 5.7 | 12–14 | N.S. |
| (13) L.T.S. asymmetrical in Sn and in Cr stoved 1 × 10–12 min. at 200° C.–205° C. | Sn 0.6–0.7 g/m² Cr° 5–10 mg/m² Crox 1–5 mg/m² | Sn 0.9–1.0 g/m² Cr° 100–120 mg/m² Crox 20–25 mg/m² | 1.2–2.4 | 1.9–2.3 | 1.16 | 6–8 | N.S. |
| (14) E.C.C.S. asymmetrical in Cr | Sn: Cr° 20–30 mg/m² Crox 5–10 mg/m² | Sn: Cr° 100–120 mg/m² Crox 20–25 mg/m² | 14–17 | 25–35 | 1.9 | 7–9 | N.S. |

Note: Test 14 was carried out with a material obtained from a line producing L.T.S., without any voltage applied between the electrodes of the thinning bath. There is therefore a deposition of tin by displacement which is not measurable.

In Table IV the contact resistivities with respect to copper, $\rho Cu$, are expressed in terms of lower and upper limits. The tests assumed the availability of a specially prepared material in very long coils. The stated lower and upper limits correspond to measurements carried out on samples taken at different zones along the length. The range of values accounts for the variations possible during manufacture, but conceals the variations due to asymmetry. The variations of contact resistivity of the two faces are related because these resistivities are a function of the thickness of the coating, and local variations of coating conditions have similar affects on the two faces. The calculation of the ratio of contact resistivities of the two faces were made with average values taken between the limits.

In addition, Tests 1 to 3, 5, 7 and 8 were concerned with symmetrically coated materials, and provide comparative indications of the improvement in welding latitude achieved by the present invention.

The welding latitude can be classified as nil, mediocre, acceptable, good or excellent, depending on whether it is less than 1, between 1 and 4, between 5 and 8, between 9 and 12, or above 12.

The first conclusion to be drawn from Table IV is that, when the coatings of both faces have contact resistivities with respect to copper less than $1 \times 10^{-5}$ ohm/cm$^2$, the welding latitude is good for symmetrical coatings (Tests 1 and 7).

Another conclusion is that the ratio of the contact resistivities is more important than the absolute values of these contact resistivities for improvement of the welding latitude. In this connection, Tests 4, 11 and 12 should be compared with Tests 10, 13 and 14.

It is evident, furthermore, that the asymmetry of the radii of curvature of the electrodes causes a much greater asymmetry in the welding process. In the tests the ratio of the radii of curvature was of the order of 1.8. Apart from Test 4, in which particular factors play a part, the tests establish that good or excellent latitudes of welding are obtained with ratios of contact resistivity from of 2.8 and 5.7 (in particular Tests 11 and 12).

The Applicants have studied in particular, from the aspect of asymmetrical coatings, the materials called L.T.S. which comprise on each of the faces of a mild steel sheet a layer of tin of at most 1.05 g/cm$^2$ and a mixed layer of metallic chromium and of chromium oxide, with 5 to 140 mg/m$^2$ of metallic chromium and from 1 to 30 mg/m$^2$ of chromium in oxidised form.

EXAMPLE 5

Variation of the contact resistivity in units of 10-5 ohm/cm$^2$ as a function of tin and chromium thicknesses in mg/m$^2$ This example is a combination of Examples 2 and 3. The weighted values of the contact resistivities are shown in Table V.

TABLE V

| Sn g/m$^2$ | CrCrOx mg/m$^2$ | | | | | | | | | |
|---|---|---|---|---|---|---|---|---|---|---|
|  | 0 | 5 | 10 | 15 | 20 | 40 | 50 | 70 | 90 | 110 |
| 0.1 | 0.5 | 1.0 | 2.5 | 5.0 | 5.2 | 5.7 | 6.0 | 6.4 | 6.7 | 7.1 |
| 0.3 | 0.5 | 1.0 | 2.0 | 3.6 | 3.8 | 4.2 | 4.4 | 4.8 | 5.2 | 5.7 |
| 0.6 | 0.5 | 1.0 | 2.0 | 2.7 | 3.0 | 3.4 | 3.6 | 4.0 | 4.5 | 5.0 |
| 0.75 | 0.5 | 1.0 | 2.0 | 2.1 | 2.2 | 2.6 | 2.8 | 3.3 | 3.6 | 3.9 |
| $\geqq 0.8$ | 0.5 | 0.5 | 0.6 | 0.6 | 0.6 | 0.8 | 0.9 | 1.2 | 1.5 | 1.7 |

In all the tests, the material had been heated to a sufficient temperature and for a sufficient time for all the tin to be alloyed with the iron.

Another series of measurements was carried out to study the relationship between the asymmetry of contact resistivities of the faces and the latitude of welding.

EXAMPLE 6

As before, tests were carried out with a welding machine having an outer roller whose diameter was 110 mm and an inner roller whose diameter was 60 mm, with a gripping force of 400N and a speed of advance of the sheet material of 50 m/min. The material was an L.T.S., and an additional condition was imposed, namely that the average of the contact resistivities of the faces was greater than $2 \times 10^{-5}$ ohm/cm$^2$. The results are set out in Table VI.

TABLE VI

| $\rho$outer/$\rho$inner | 1 | 1.5 | 2 | 3 | 4.5 | 6 |
|---|---|---|---|---|---|---|
| Welding latitude | 1–3 | 6–8 | 7–9 | 8–11 | 10–12 | 12–14 |

This confirms in particular one of the conclusions stated in Example 4, regarding the comparative importance to the welding latitude of the asymmetrical radii of curvature of the electrodes, and the asymmetrical contact resistivities of the coatings.

What apparently emerges from this comparison is that the improvement of weldability produced by an asymmetry of the contact resistivities depends more on the existence of than on the value of the asymmetry between the radii of curvature of the electrodes. As stated above altering the diameter of the inner roller from 62 mm to 58 mm, that is a variation in the diameter ratio from 1.77 to 1.9, did not produce any significant variation in the latitude of welding.

Despite difficulties encountered when assessing the influence on the welding latitude of the ratio of the radii of curvature, because the machine has to be converted significantly in order to produce a significant modification in the ratio of the roller diameters, with resulting changes in the welding conditions, the Applicants have been able to show, by laboratory tests, that the asymmetry of the radii of curvature only had a significant effect when the ratio of the radii of curvature was at least 1.2. From Table IV, it appears that even with a ratio of contact resistivities of 1.5, the latitude of welding is considerably increased. In addition, Test 13 in Example 4 shows a not-negligible increase in the latitude of welding compared with Example 3. Thus there appears a series of convergent indications that the asymmetries become significant for ratios from approximately 1.2 upwards.

It follows from the intuitive observations of the Applicants that an upper limit must exist above which the asymmetry must lead to a reduction in the latitude of welding. But the Applicants have not been able to show such a reduction in the latitude of welding. Example 4, excepting Test 4, shows however that with the widest range of materials, each material whose higher resistance face has a contact resistivity greater than $35 \times 10^{-5}$ ohm/cm$^2$ was not weldable when applying the rules specified by the Applicants. This test is however special. Exceptional weldability, in the sense defined above, can be due to the presence of alloyed tin which is capable of diffusing rapidly in the interface between the edges.

Coatings of substrates of sheet steel, capable of protecting the substrate in the conditions of use of food cans, can be produced under acceptable economic conditions with contact resistivities lower than $50 \times 10^{-5}$ ohm/cm$^2$. This value of $50 \times 10^{-5}$ ohm/cm$^2$ will therefore be taken as a reasonable upper limit.

The Applicants have directed their research more particularly to L.T.S. materials, which have a good weldability, even without asymmetry, as long as the layer of tin has not substantially diffused into the underlying steel, and which have a rather better resistance to corrosion than the steels called E.C.C.S., which are coated on each face with a composite layer of metallic chromium and of chromium oxide. But the weldability of L.T.S. materials diminishes when they are lacquered with thermosettable lacquers in order to improve their resistance to corrosion with respect to particular products, or for any other reason.

Because the present invention enables good weldability to be re-established by variation of the asymmetry of the contact resistivities, and because, as shown in Example 4, L.T.S. materials can be produced with adequate asymmetries of contact resistivity with relatively minor changes in the coating compositions, it is now possible to produce a whole range of materials which can be adapted to various conditions without substantial modification of the basic preparation process. In fact it is sufficient to regulate the distribution of deposition currents between the faces of the sheet steel pro rata with the coating thicknesses in the different baths through which the sheet passes to be coated first with tin, and then with the composite layer of metallic chromium and chromium oxide.

Practically all the tests were carried out under substantially constant deposition conditions for the composite layer of metallic chromium and chromium in oxidised form, with the exception of the density of current per face. These conditions correspond to preferred compositions of the composite layer. The regulation of the asymmetry of thickness of the composite layers neither modified the relative composition of the composite layers in proportions which would substantially alter the resistance to corrosion nor modified the contact resistivities. Therefore, in a number of examples, the thicknesses of the composite layers have been expressed in terms of total chromium content.

What we claim is:

1. A process for welding cylindrically rolled container bodies, in particular for food cans, comprising the steps of:
   providing mild sheet steel material having on at least one of its faces a protective conductive coating having a contact resistivity with respect to copper equal to or greater than $10^{-5}$ ohm/cm$^2$;
   rolling the sheet material into a cylindrical body with overlapping edges;
   welding said overlapping edges along a longitudinal welding line with two resistance welding electrodes while advancing the rolled sheet material at a speed up to 50 m/min, the ratio of the radius of curvature of a first of said electrodes to a second of said electrodes being at least 1.2;
   wherein the improvement comprises:
   carrying out the providing step with sheet material having a ratio of contact resistivity of a first face to a seconc face of at least about 1.2; and
   carrying out the rolling step so that the first face comes in contact with the first electrode.

2. A process according to claim 1, wherein each face of the sheet material has an inner layer of tin up to 1.05 g/m$^2$ and an outer composite layer of chromium and chromium oxide having about 5–140 mg/m$^2$ of metallic chromium and about 1–30 mg/m$^2$ of chromium in oxidized form, the thickness of tin on the first face is less than that on the second face, the inner and outer layers being selected so that the ratio of the contact resistivity of the faces with respect to copper is at least 1.5.

3. A process according to claim 2, wherein the second face is coated with 0.7–0.8 g/m$^2$ of tin and 50–60 mg/m$^2$ of metallic chromium with 10–12 mg/m$^2$ of chromium in oxidized form, and the first face is coated with 0.2–0.3 g/m$^2$ of tin and 50–60 mg/m$^2$ of metallic chromium with 10–12 mg/m$^2$ of chromium in oxidized form.

4. A process according to claim 1, wherein each face of the sheet material has an inner layer of tin up to 1.05 g/m$^2$ and an outer composite layer of chromium and chromium oxide having about 5–140 mg/m$^2$ of metallic chromium and about 1–30 mg/m$^2$ of chromium in oxidized form, the thickness of chromium on the second face is less than that on the first face, the inner and outer layers being selected so that the ratio of the contact resistivity of the faces with respect to copper is at least 1.5.

5. A process according to claim 1, wherein the second face is coated with 0.4–0.8 g/m$^2$ of tin and 26–60 mg/m$^2$ of metallic chromium with 10–12 mg/m$^2$ of chromium in oxidized form, and the first face is coated with 0.01–0.6 g/m$^2$ of tin and 50–85 mg/m$^2$ of metallic chromium with 20–25 mg/m$^2$ of chromium in oxidized form.

6. A process according to claim 4, wherein the second face is coated with 0.4–0.6 g/m$^2$ of tin and 25–35 mg/m$^2$ of metallic chromium with 10–12 mg/m$^2$ of chromium in oxidized form, and the first face is coated with 0.4–0.6 g/m$^2$ of tin and 75–85 mg/m$^2$ of metallic chromium with 10–12 mg/m$^2$ of chromium in oxidized form.

7. A process according to claim 4, wherein the second face is coated with 0.6–0.7 g/m$^2$ of tin and 5–10 mg/m$^2$ of metallic chromium with 1–5 mg/m$^2$ of chromium in oxidized form, and the first face is coated with 0.9–1.0 g/m$^2$ of tin and 100–120 mg/m$^2$ of metallic chromium with 20–25 mg/m$^2$ of chromium in oxidized form.

8. A process according to claim 1, wherein each face of the sheet material has an inner layer of tin up to 1.05 g/m$^2$ and an outer composite layer of chromium and chromium oxide having about 5–140 mg/m$^2$ of metallic chromium and about 1–30 mg/m$^2$ of chromium in oxidized form, the thickness of tin on the first face is less than that on the second face and the thickness of chromium on the second face is less than that on the first face, the inner and outer layers being selected so that the ratio of the contact resistivity of the faces with respect to copper is at least 1.5.

9. A process according to claim 8, wherein the second face is coated with 0.7–0.8 g/m$^2$ of tin and 25–35 mg/m$^2$ of metallic chromium with 10–12 mg/m$^2$ of chromium in oxidized form, and the first face is coated with 0.2–0.3 g/m$^2$ of tin and 75–85 mg/m$^2$ of metallic chromium with 10–12 mg/m$^2$ of chromium in oxidized form.

10. A process according to claim 8, wherein the second face is coated with 0.4–0.6 g/m$^2$ of tin and 25–35 mg/m² of metallic chromium with 10–12 mg/m² of chromium in oxidized form, and the first face is coated with 0.01–0.1 g/m² of tin and 75–85 mg/m² of metallic chromium with 10–12 mg/m² of chromium in oxidized form.

11. A process according to claim 1, wherein the ratio of the contact resistivity of the first face to that of the second face is at least 1.5.

12. A process according to claim 1, wherein there is provided on each of the faces of the steel material a protective conductive coating having a contact resistivity with respect to copper equal to or greater than $10^{-5}$ ohm/cm².

13. A process according to claim 1, wherein only said first face of the sheet steel material is tinned.

14. A process according to claim 1, wherein one face of the sheet steel material is nickel plated and the other face is nickel chrome plated.

15. A process according to claim 1, wherein each face of the sheet steel material has an inner layer of tin and an outer composite layer of chromium and chromium oxide.

16. A process according to claim 1, wherein said first and second electrodes are rollers.

* * * * *